(12) United States Patent
Matsuto et al.

(10) Patent No.: US 10,865,861 B2
(45) Date of Patent: Dec. 15, 2020

(54) ELECTRIC ACTUATOR

(71) Applicant: NTN CORPORATION, Osaka (JP)

(72) Inventors: Takushi Matsuto, Shizuoka (JP);
Yoshinori Ikeda, Shizuoka (JP); Yuuki Naitou, Shizuoka (JP)

(73) Assignee: NTN CORPORATION, Osaka (JP)

( * ) Notice: Subject to any disclaimer, the term of this patent is extended or adjusted under 35 U.S.C. 154(b) by 172 days.

(21) Appl. No.: 16/073,024

(22) PCT Filed: Jan. 25, 2017

(86) PCT No.: PCT/JP2017/002479
§ 371 (c)(1),
(2) Date: Jul. 26, 2018

(87) PCT Pub. No.: WO2017/138353
PCT Pub. Date: Aug. 17, 2017

(65) Prior Publication Data
US 2019/0040939 A1 Feb. 7, 2019

(30) Foreign Application Priority Data

Feb. 9, 2016 (JP) .................... 2016-022691

(51) Int. Cl.
*F16H 25/00* (2006.01)
*F16H 25/20* (2006.01)
(Continued)

(52) U.S. Cl.
CPC ......... *F16H 25/2015* (2013.01); *F16H 25/22* (2013.01); *F16H 25/2204* (2013.01);
(Continued)

(58) Field of Classification Search
CPC ...... F16H 25/2015; F16H 25/22; F16H 25/24; F16H 25/2204; F16H 2025/2068;
(Continued)

(56) References Cited

U.S. PATENT DOCUMENTS 4,603,594 A * 8/1986 Grimm ................. F16H 25/20
74/89.39
6,215,299 B1 4/2001 Reynolds et al.
(Continued)

FOREIGN PATENT DOCUMENTS

JP 11-160010 6/1999
JP 2004-312880 11/2004
(Continued)

OTHER PUBLICATIONS

Extended European Search Report dated Sep. 23, 2019 in corresponding European Patent Application No. 17750078.2.
(Continued)

*Primary Examiner* — Victor L Macarthur
(74) *Attorney, Agent, or Firm* — Wenderoth, Lind & Ponack, L.L.P.

(57) ABSTRACT

Provided is a ball screw device (31), including: a ball screw shaft (33); and a ball screw nut (32) which is rotatably fitted to an outer periphery of the ball screw shaft (33) through intermediation of a plurality of balls (34), wherein the ball screw shaft (33) performs a linear motion in an axial direction along with rotation of the ball screw nut (32), wherein the ball screw shaft (33) has a hollow shape having a hole portion (33*b*) extending in the axial direction, and wherein a stroke detection sensor (55) configured to detect an amount of displacement of the ball screw shaft (33) in the axial direction is arranged in the hole portion (33*b*).

7 Claims, 12 Drawing Sheets

(51) Int. Cl.
    *G01B 7/00*     (2006.01)
    *F16H 25/22*     (2006.01)
    *F16H 25/24*     (2006.01)
    *G01D 5/14*     (2006.01)
    *F16D 121/24*     (2012.01)

(52) U.S. Cl.
    CPC ............... *F16H 25/24* (2013.01); *G01B 7/00* (2013.01); *G01D 5/145* (2013.01); *F16D 2121/24* (2013.01); *F16H 2025/2068* (2013.01); *F16H 2025/2075* (2013.01); *F16H 2025/2087* (2013.01); *G01B 7/003* (2013.01)

(58) Field of Classification Search
    CPC ..... F16H 2025/2075; F16H 2025/2087; G01B 7/00; G01B 7/003; G01D 5/145; F16D 2121/24
    See application file for complete search history.

(56) References Cited

U.S. PATENT DOCUMENTS

| | | | |
|---|---|---|---|
| 8,141,688 B2* | 3/2012 | Matsushita | F16D 55/226 |
| | | | 188/158 |
| 8,266,976 B2* | 9/2012 | Waide | F16H 25/2252 |
| | | | 74/424.92 |
| 2005/0258823 A1 | 11/2005 | Kinoshita | |
| 2009/0317027 A1* | 12/2009 | Burt | F16H 25/2427 |
| | | | 384/448 |
| 2014/0353071 A1 | 12/2014 | Ando et al. | |

FOREIGN PATENT DOCUMENTS

| | | |
|---|---|---|
| JP | 2005-170064 | 6/2005 |
| JP | 2005-330942 | 12/2005 |
| JP | 2014-232034 | 12/2014 |

OTHER PUBLICATIONS

International Preliminary Report on Patentability and Written Opinion of the International Searching Authority dated Aug. 14, 2018 in International Application No. PCT/JP2017/002479.

International Search Report dated Mar. 28, 2017 in International (PCT) Application No. PC/TJP2017/002479.

* cited by examiner

ELECTRIC ACTUATOR

TECHNICAL FIELD

The present invention relates to a ball screw device and an electric actuator including the same.

BACKGROUND ART

As a motion conversion device configured to convert a rotary motion into a linear motion and output the linear motion, there has been known a ball screw device which includes a ball screw shaft and a ball screw nut rotatably fitted to an outer periphery of the ball screw shaft through intermediation of a plurality of balls. Further, there has been known an electric actuator which employs the ball screw device of this type as a motion conversion mechanism, and performs operations of, for example, an automatic transmission, a brake, and a steering wheel of an automobile using power of a motor (electric motor) (Patent Literature 1). The electric actuator of Patent Literature 1 has a configuration in which the ball screw shaft advances or retreats in an axial direction along with rotation of the ball screw nut (rotation about an axis of the ball screw shaft) by a rotary motion of the motor.

As in the electric actuator of Patent Literature 1, when the ball screw device is employed as the motion conversion mechanism, and the ball screw shaft serves as an output member of the actuator, an output (load) in accordance with the amount of advance or retreat movement in the axial direction (amount of displacement in the axial direction) of the ball screw shaft is applied to an object to be operated. Thus, it is required that the amount of displacement of the ball screw shaft in the axial direction be managed and controlled with high accuracy. Therefore, in the electric actuator of this type, a sensor configured to detect the amount of displacement of the ball screw shaft in the axial direction is typically provided. In the electric actuator of Patent Literature 1, a rotation angle sensor and a magnet, which is provided to the ball screw nut functioning also as a motor rotor, are arranged so as to be opposed to each other with a gap in the axial direction, thereby being capable of detecting a change in magnetic flux of the magnet along with the rotation of the ball screw nut and indirectly deriving the amount of displacement of the ball screw shaft in the axial direction based on the detection value.

CITATION LIST

Patent Literature 1: JP 2005-330942 A

SUMMARY OF INVENTION

Technical Problem

However, when the amount of displacement of the ball screw shaft in the axial direction is indirectly derived as in Patent Literature 1, the amount of displacement of the ball screw shaft cannot always be accurately detected because the detection of the amount of displacement of the ball screw shaft is affected by, for example, play, rigidity, and operation accuracy of the ball screw device. Therefore, there is a risk in that a ball screw device as well as an electric actuator which are highly reliable with excellent operation accuracy of the ball screw shaft cannot be achieved. In particular, for example, when a speed reducer is provided between the motor part and the ball screw device in order to apply the electric actuator for use in controlling an object to be operated which requires a large load, the detection of the amount of displacement of the ball screw shaft is affected also by, for example, operation accuracy of the speed reducer. Therefore, unavailability of accurate detection of the amount of displacement of the ball screw shaft is further increased.

Meanwhile, when the electric actuator of this type is to be used for vehicles such as automobiles, it is required that the electric actuator be smaller in weight and size as much as possible to secure excellent mountability with respect to a device to be used.

In view of the actual circumstances described above, an object of the present invention is to achieve a ball screw device which is small in weight and size and is capable of accurately detecting an amount of displacement of a ball screw shaft in an axial direction. Further, another object of the present invention is to achieve an electric actuator which is small in weight and size so as to be excellent in mountability with respect to a device to be used and is highly reliable with excellent operation accuracy of an output member.

Solution to Problem

According to one embodiment of the present invention devised so as to solve the above-mentioned problem, there is provided a ball screw device, comprising: a ball screw shaft; and a ball screw nut which is rotatably fitted to an outer periphery of the ball screw shaft through intermediation of a plurality of balls, wherein the ball screw shaft advances and retreats in an axial direction along with rotation of the ball screw nut, wherein the ball screw shaft has a hollow shape having a hole portion extending in the axial direction, and wherein a stroke detection sensor configured to detect an amount of displacement of the ball screw shaft in the axial direction is arranged in the hole portion.

With such a configuration, the amount of displacement of the ball screw shaft in the axial direction can be directly detected. Thus, the detection of the amount of displacement of the ball screw shaft is not affected by, for example, play, rigidity, and operation accuracy of the ball screw device, thereby being capable of accurately detecting the amount of displacement of the ball screw shaft. Such actions and effects can be similarly achieved also in a case in which a speed reducer configured to reduce a speed of rotation of a prime motor such as an engine or a motor, which is configured to apply a rotational force to the ball screw nut, and transmit the rotation to the ball screw nut is additionally provided between the prime motor and the ball screw nut. Therefore, a ball screw device which is highly reliable with excellent operation accuracy of a ball screw shaft can be achieved. Further, the stroke detection sensor is arranged on an inner periphery of a ball screw shaft having a hollow shape. Thus, unlike the case in which the sensor of this type is arranged outside the ball screw shaft, it is not required that a dedicated space for arrangement of the sensor be additionally secured. Therefore, the ball screw device comprising the stroke detection sensor can be reduced in weight and size.

The stroke detection sensor may be a Hall sensor configured to detect a magnetic field in the axial direction and a radial direction formed in a periphery of a permanent magnet arranged so as to be opposed to the stroke detection sensor through a radial gap, and calculate the amount of displacement of the ball screw shaft in the axial direction based on the detection of the magnetic field.

The ball screw device according to the present invention has the above-mentioned features. Thus, an electric actuator comprising a motor part driven upon receiving supply of power and a motion conversion mechanism part configured to convert a rotary motion of the motor part into a linear motion, employing the above-mentioned ball screw device as the motion conversion mechanism part, and having a center axis of the ball screw shaft and a rotation center of the motor part matched with each other has small weight and size, is excellent in mountability with respect to a device to be used, and is highly reliable with high operation accuracy of an output member.

The motion conversion mechanism part may further comprise a speed reducer configured to reduce a speed of rotation of the motor part and transmit the rotation to the ball screw nut. In this case, a small motor can be employed. Thus, the electric actuator can be further reduced in weight and size. As the speed reducer, a planetary gear speed reducer can be employed. With the planetary gear speed reducer, a speed reduction ratio can easily be adjusted by, for example, changing a gear specification or changing the number of stages of the installed planetary gears. Further, there is also an advantage in that, even when the planetary gears are installed with a large number of stages, an increase in size of the speed reducer can be avoided.

The electric actuator may further comprise an urging member configured to always urge the ball screw shaft to an original point side. With such a configuration, for example, when drive power is not properly supplied to the motor part, the ball screw shaft is automatically returned to the original point, thereby being capable of reducing as much as possible the risk of causing an adverse influence on operations of an object to be operated (device to be used).

The electric actuator having the above configuration further comprises: a housing, which comprises a plurality of members being coupled to one another in the axial direction, and is configured to accommodate the motor part and the motion conversion mechanism part; and a terminal part which is configured to hold a power supply circuit and the stroke detection sensor, the power supply circuit being configured to supply the power (drive power) to the motor part. In this case, the terminal part may be sandwiched by the members forming the housing from both sides in the axial direction. Thus, ease of assembly of the electric actuator can be improved.

The terminal part may have, on an outer peripheral portion thereof, an opening portion for allowing a lead wire connected to the power supply circuit and a signal line connected to the stroke detection sensor to be drawn out to a radially outer side of the housing. With such a configuration, for example, an electric actuator comprising a plurality of electric actuators arranged in series and being capable of causing respective ball screw shafts to individually perform a linear motion can easily be achieved. Such an electric actuator can be mounted to a device to be used with two or more objects to be operated, for example, can be mounted to a dual clutch transmission (DCT) being one type of automatic transmissions, thereby being capable contributing to simplification and reduction in weight and size of an automatic transmission as a whole.

Advantageous Effects of Invention

As described above, according to one embodiment of the present invention, there can be achieved the ball screw device which is small in weight and size and is capable of accurately detecting the amount of displacement of the ball screw shaft in the axial direction. Further, by applying the ball screw device according to the present invention in the motion conversion mechanism part of the electric actuator, there can be achieved the electric actuator which is small in weight and size so as to be excellent in mountability with respect to a device to be used and is highly reliable with excellent operation accuracy of the output member.

DESCRIPTION OF EMBODIMENTS

Now, description is made of an embodiment of the present invention with reference to the drawings.

Figure 1:
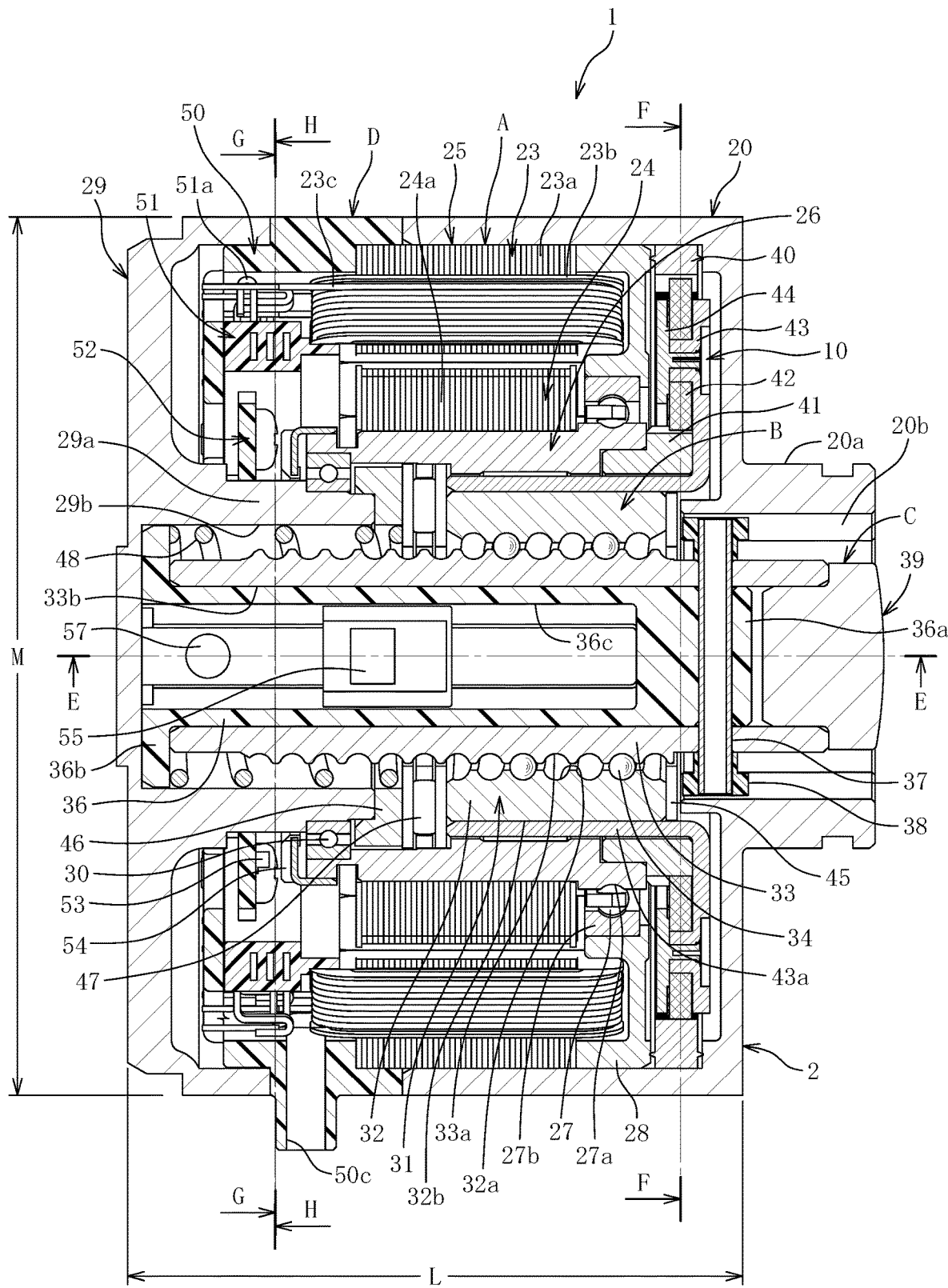
FIG. 1 is a vertical sectional view of an electric actuator comprising a ball screw device according to one embodiment of the present invention.
Figure 2:
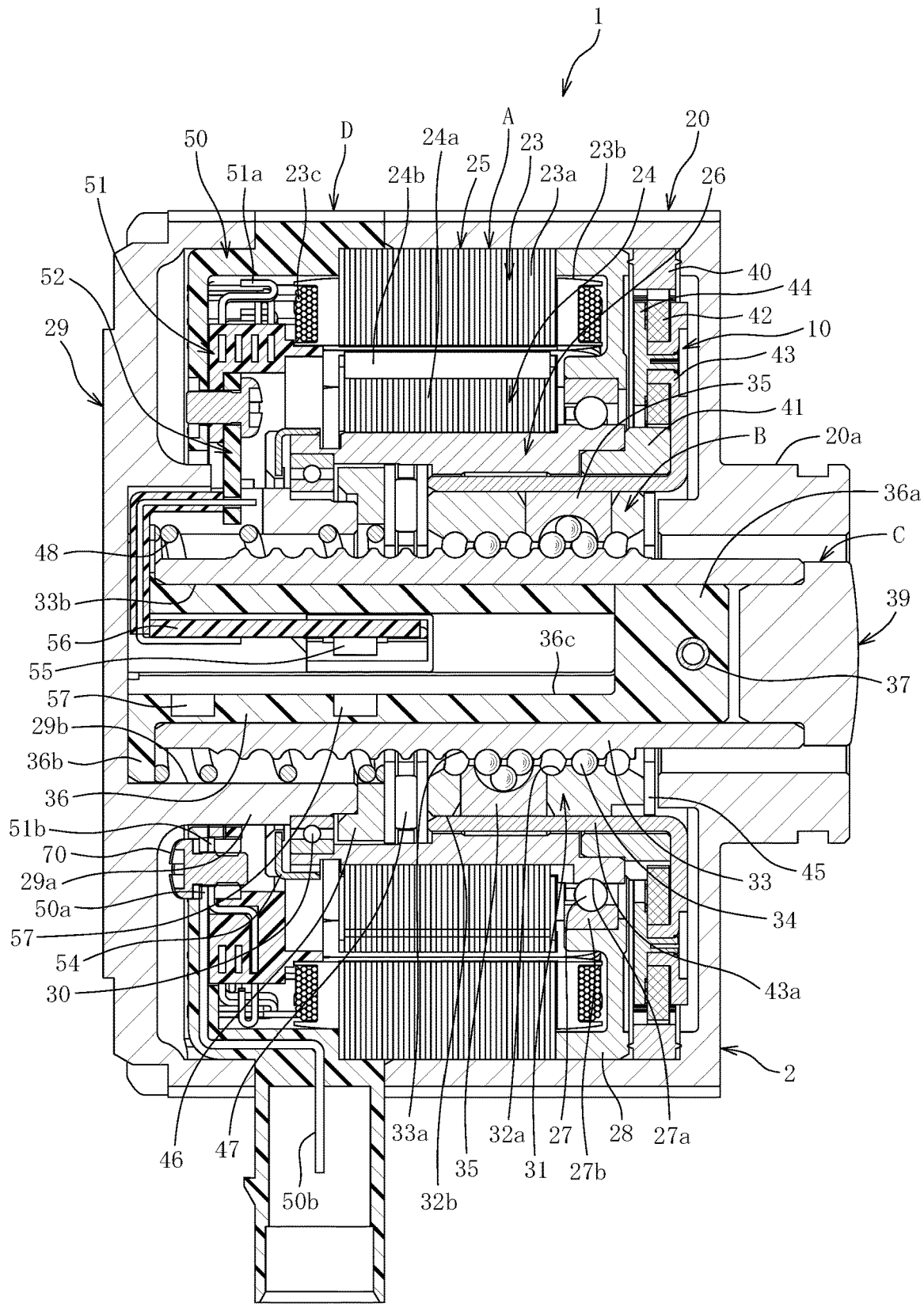
FIG. 2 is a sectional view as seen from a direction indicated by the arrows of the line E-E in FIG. 1.
Figure 3:
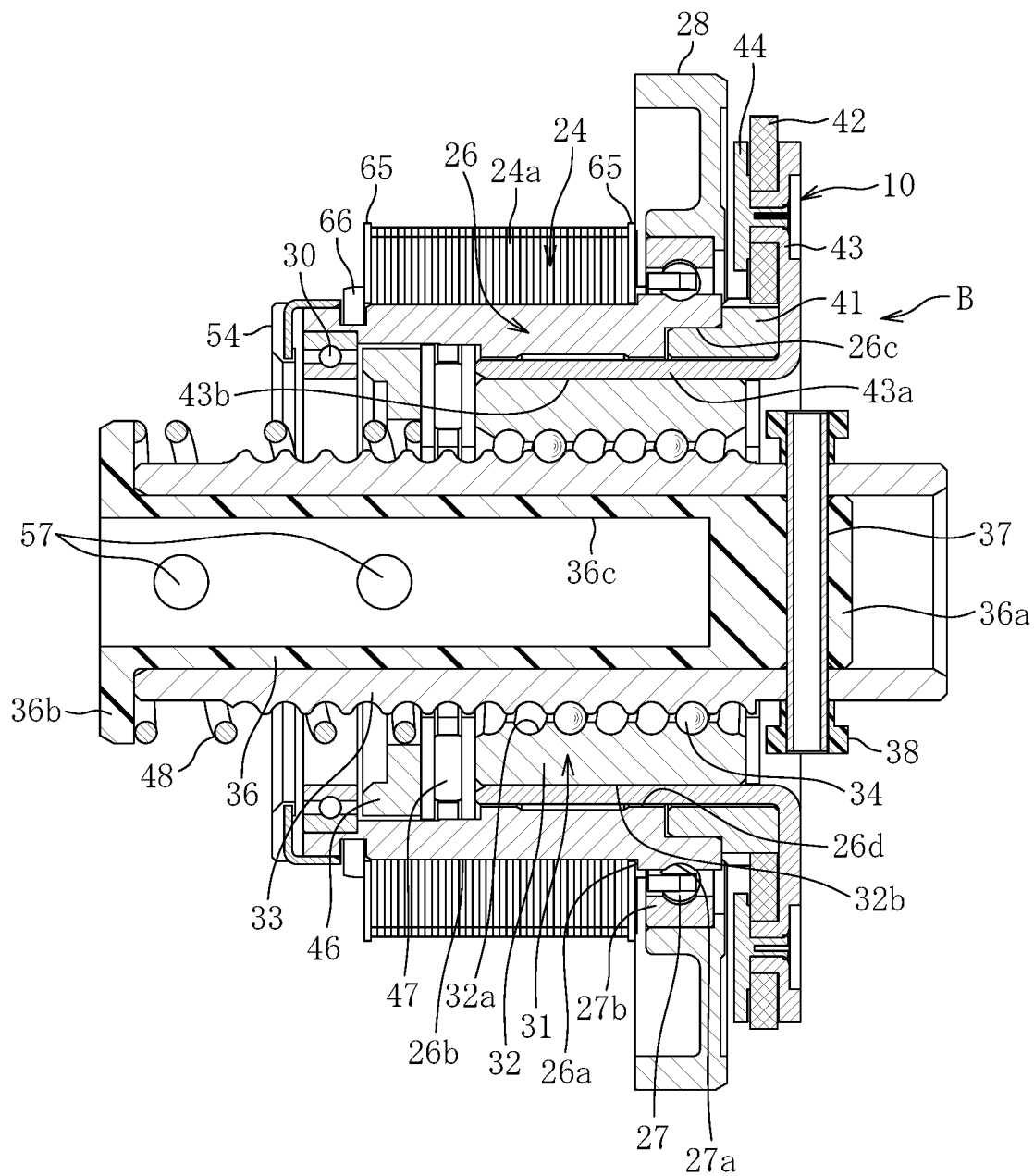
FIG. 3 is an enlarged vertical sectional view for illustrating a rotor of a motor and a motion conversion mechanism part.

FIG. 1 is a vertical sectional view of an electric actuator comprising a ball screw device according to one embodiment of the present invention. FIG. 2 is a sectional view as seen from a direction indicated by the arrows of the line E-E in FIG. 1. FIG. 3 is an enlarged vertical sectional view for illustrating a rotor of a motor and a motion conversion mechanism part. FIG. 1 and FIG. 2 are illustrations of a state in which (a ball screw shaft of a ball screw device which forms) an output member of the electric actuator is located at an original point. The state of being located at the original point corresponds to a position at which a cover 29 and a spring mounting collar 36 are mechanically held in abutment against each other by a compression coil spring 48 being an urging member described later. As illustrated in FIG. 1 and FIG. 2, the electric actuator 1 comprises a motor part A, a motion conversion mechanism part B, an operation part C, and a terminal part D, which are accommodated and held in a housing 2. The motor part A is driven upon receiving supply of power. The motion conversion mechanism part B is configured to convert a rotary motion of the motor part A into a linear motion and output the linear motion. The operation part C is configured to operate an object to be operated (not shown).

The housing 2 comprises a plurality of members being coupled to one another in the axial direction in a state of being coaxially arranged. The housing 2 in this embodiment is formed of a coupled body comprising a tubular casing 20, a cover 29, and a terminal main body 50. The casing 20 has an end portion on one side in the axial direction (right side of the drawing sheet in FIG. 1 and FIG. 2, which similarly applies to the following description) and an end portion on another side in the axial direction (left side of the drawing sheet in FIG. 1 and FIG. 2, which similarly applies to the following description), which are opened. The cover 29 is configured to close an opening in the end portion of the casing 20 on the another side in the axial direction. The terminal main body 50 is arranged between the casing 20 and the cover 29, and forms the terminal part D. The cover 29 and the terminal main body 50 are mounted and fixed to the casing 20 by assembly bolts 61 illustrated in FIG. 9 and FIG. 10.

The motor part A is formed of a motor 25 of a radial gap type (specifically, a three-phase brushless motor having a U-phase, a V-phase, and a W-phase) comprising a stator 23 fixed to the casing 20 and a rotor 24 arranged so as to be opposed to an inner periphery of the stator 23 through a radial gap. The stator 23 comprises a bobbin 23b and a coil 23c. The bobbin 23b for insulation is mounted to the stator core 23a. The coil 23c is wound around the bobbin 23b. The rotor 24 comprises a rotor core 24a, a permanent magnet 24b mounted to an outer periphery of the rotor core 24a, and a hollow shaft-shaped rotor inner 26 having the rotor core 24a mounted to an outer periphery thereof.

As illustrated in FIG. 3, after a side plate 65 is set on a shoulder portion 26a of the rotor inner 26 on the one side in the axial direction, the rotor core 24a is fitted to an outer peripheral surface 26b of the rotor inner 26. After the permanent magnet 24b is fitted to an outer periphery of the rotor core 24a, the permanent magnet 24b is positioned and fixed by a side plate 65, which is mounted to the rotor inner 26 on an outer side of the end portion of the rotor core 24a on the another side in the axial direction, and a circlip 66 mounted on an outer side of the side plate 65 in the axial direction.

As illustrated in FIG. 1 to FIG. 3, on an outer periphery of the end portion of the rotor inner 26 on the one side in the axial direction, an inner raceway surface 27a of the rolling bearing 27 is formed. An outer ring 27b of the rolling bearing 27 is mounted to a bearing holder 28 fixed to an inner peripheral surface of the casing 20. Moreover, a rolling bearing 30 is mounted between an inner peripheral surface of the end portion of the rotor inner 26 on the another side in the axial direction and an outer peripheral surface of a cylindrical portion 29a of the cover 29. With such a configuration, the rotor inner 26 is supported so as to be rotatable with respect to the housing 2 through the rolling bearings 27 and 30.

As illustrated in FIG. 1 to FIG. 3, the motion conversion mechanism part B in this embodiment comprises a ball screw device 31 and a speed reducer (planetary gear speed reducer 10).

The ball screw device 31 comprises a ball screw shaft 33, a ball screw nut 32, and deflectors 35. The ball screw shaft 33 serves as an output member of the electric actuator 1, and is arranged coaxially with the rotor 24 (rotor inner 26). The ball screw nut 32 is rotatably fitted to an outer periphery of the ball screw shaft 33 through intermediation of a plurality of balls 34. The deflectors 35 each serve as a circulation member. Between a spiral groove 32a formed in an inner peripheral surface of the ball screw nut 32 and a spiral groove 33a formed in an outer peripheral surface of the ball screw shaft 33, the plurality of balls 34 are loaded, and the two deflectors 35 are incorporated. With such a configuration, when the ball screw shaft 33 advances or retreats (performs a linear motion) in the axial direction, two rows of balls 34 circulate between the spiral grooves 32a and 33a. An actuator head 39 serving as the operation part C is removably mounted to an end portion of the ball screw shaft 33 on the one side in the axial direction.

The ball screw shaft 33 has a hollow shape with a hole portion (in this embodiment, a through hole which is opened in end surfaces on both sides in the axial direction) 33b extending in the axial direction, and the spring mounting collar 36 is received in the hole portion 33b. The spring mounting collar 36 is made of a resin material such as PPS, and integrally comprises a circular solid portion 36a, a flange-shaped spring receiving portion 36b, and a cylinder portion 36c. The circular solid portion 36a is formed at an end portion of the spring mounting collar 36 on the one side in the axial direction. The spring receiving portion 36b is formed at an end portion of the spring mounting collar 36 on the another side in the axial direction. The cylinder portion 36c connects the circular solid portion 36a and the spring receiving portion 36b to each other.

The spring mounting collar 36 received in the hole portion 33b of the ball screw shaft 33 is coupled and fixed to the ball screw shaft 33 by fitting a pin 37 so as to penetrate through the circular solid portion 36a and the ball screw shaft 33 in a radial direction. Both end portions of the pin 37 project radially outward from the outer peripheral surface of the ball screw shaft 33, and guide collars 38 are externally fitted to the projecting portions so as to be rotatable. The guide collars 38 are made of a resin material such as PPS, and are fitted to guide grooves 20b (also see FIG. 5). The guide grooves 20b are formed in an inner periphery of a small-diameter cylindrical portion 20a of the casing 20 and extend in the axial direction. With such a configuration, when the ball screw nut 32 rotates about an axis of the ball screw shaft 33 along with rotation of the motor 25, the ball screw shaft 33 performs a linear motion in the axial direction while being stopped in rotation.

As illustrated in FIG. 1 to FIG. 4, the planetary gear speed reducer 10 comprises a ring gear 40, a sun gear 41, a plurality of (four in this embodiment) planetary gears 42, a planetary gear carrier 43, and planetary gear holders 44. The ring gear 40 is fixed to the casing 20. The sun gear 41 is press-fitted and fixed to an inner peripheral surface of a step portion of the rotor inner 26. The planetary gears 42 are arranged between the ring gear 40 and the sun gear 41, and mesh with the gears 40 and 41. The planetary gear carrier 43 and the planetary gear holders 44 rotatably hold the planetary gears 42.

Figure 4:
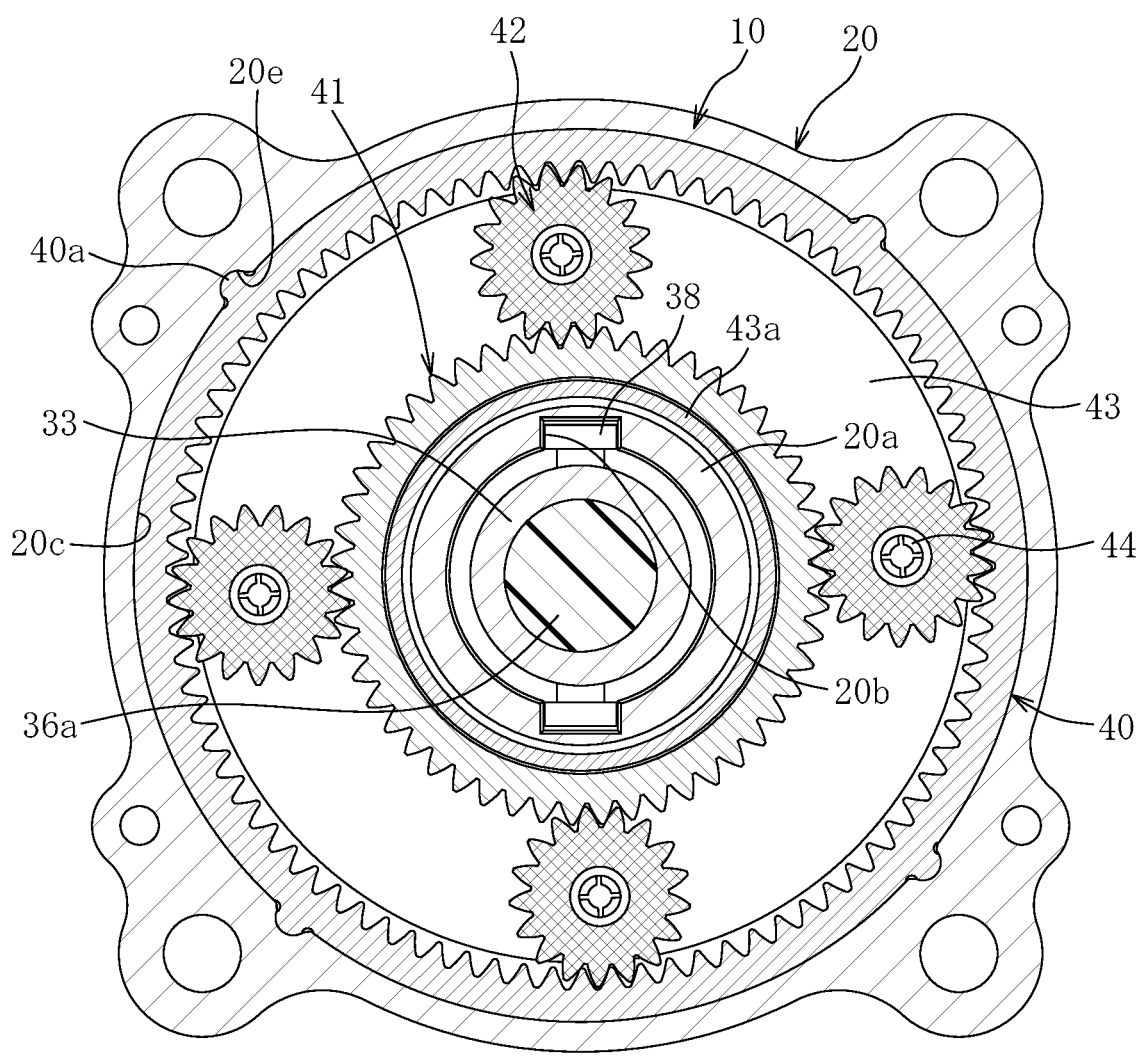
FIG. 4 is a sectional view as seen from a direction indicated by the arrows of the line F-F in FIG. 1.

As illustrated in FIG. 4, notches 40a which project radially outward are formed on an outer periphery of the ring gear 40 at a plurality of positions (four positions in the illustrated example) apart from one another in the circumferential direction. The notches 40a are fitted to axial grooves 20e (also see FIG. 5) formed at four positions apart from one another in the circumferential direction of an inner peripheral surface 20c of the casing 20. With this configuration, the ring gear 40 is stopped in rotation with respect to the casing 20.

The planetary gear carrier 43 is rotatable relative to the rotor inner 26. As illustrated in FIG. 1 to FIG. 3, the planetary gear carrier 43 integrally comprises a cylindrical portion 43a which is arranged between the inner peripheral surface of the rotor inner 26 and an outer peripheral surface 32b of the ball screw nut 32. An outer peripheral surface of the cylindrical portion 43a is opposed to an inner peripheral surface of the rotor inner 26 (and an inner peripheral surface of the sun gear 41) through a radial gap, and an inner peripheral surface of the cylindrical portion 43*a* is press-fitted to the outer peripheral surface 32*b* of the ball screw nut 32. With the planetary gear speed reducer 10 having the configuration described above, rotation of the rotor inner 26 of the motor 25 is reduced in speed and transmitted to the ball screw nut 32. With this action, rotation torque can be increased. Thus, the motor 25 having a small size can be employed, thereby being capable of reducing the weight and size of the electric actuator 1 as a whole.

As illustrated in FIG. 1 to FIG. 3, a thrust washer 45 is provided between an end surface of the ball screw nut 32 on the one side in the axial direction and the casing 20, and a thrust needle roller bearing 47 is provided between a thrust receiving ring 46 mounted to an outer periphery of a distal end portion of the cylindrical portion 29*a* of the cover 29 and an end surface of the ball screw nut 32 on the another side in the axial direction. With this thrust needle roller bearing 47, a thrust load which is generated at the time of the linear motion (advance) of the ball screw shaft 33 toward the one side in the axial direction is smoothly supported.

As illustrated in FIG. 1 and FIG. 2, the compression coil spring 48 serving as an urging member is provided between an inner peripheral surface 29*b* of the cylindrical portion 29*a* of the cover 29 and the outer peripheral surface of the ball screw shaft 33. End portions of the compression coil spring 48 on the one side and the another side in the axial direction are held in abutment against the thrust needle roller bearing 47 and the spring receiving portion 36*b* of the spring mounting collar 36, respectively. With a spring force of the compression coil spring 48 provided in such a manner, the ball screw shaft 33 coupled to the spring mounting collar 36 is always urged toward the original point side. With such a configuration, for example, when the drive power is not properly supplied to the motor part A (motor 25), the ball screw shaft 33 is automatically returned to an original point, thereby being capable of reducing as much as possible the risk of causing an adverse influence on the operation of the object to be operated (not shown).

Figure 9:
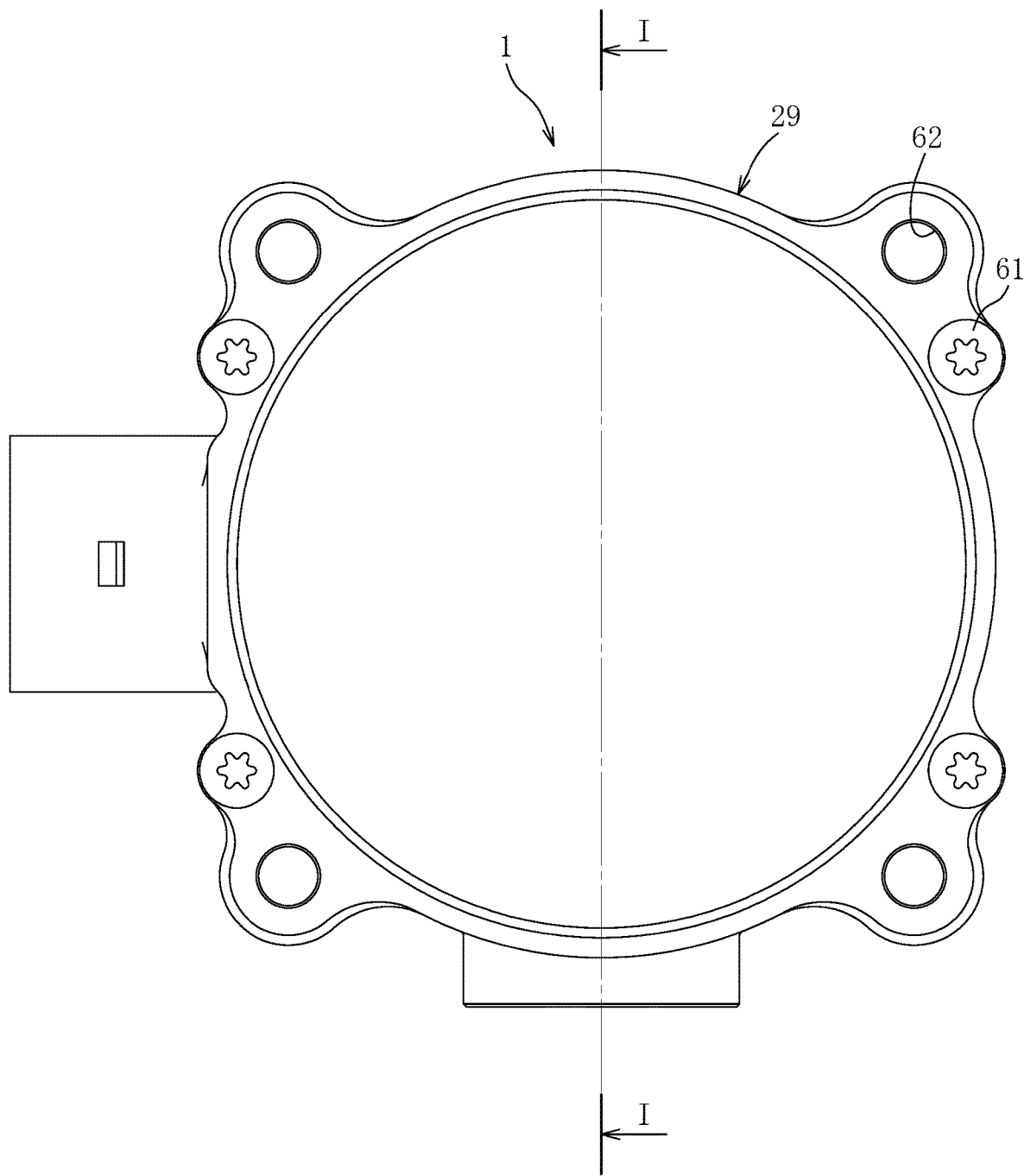
FIG. 9 is a left side view of the electric actuator illustrated in FIG. 1.
Figure 10:
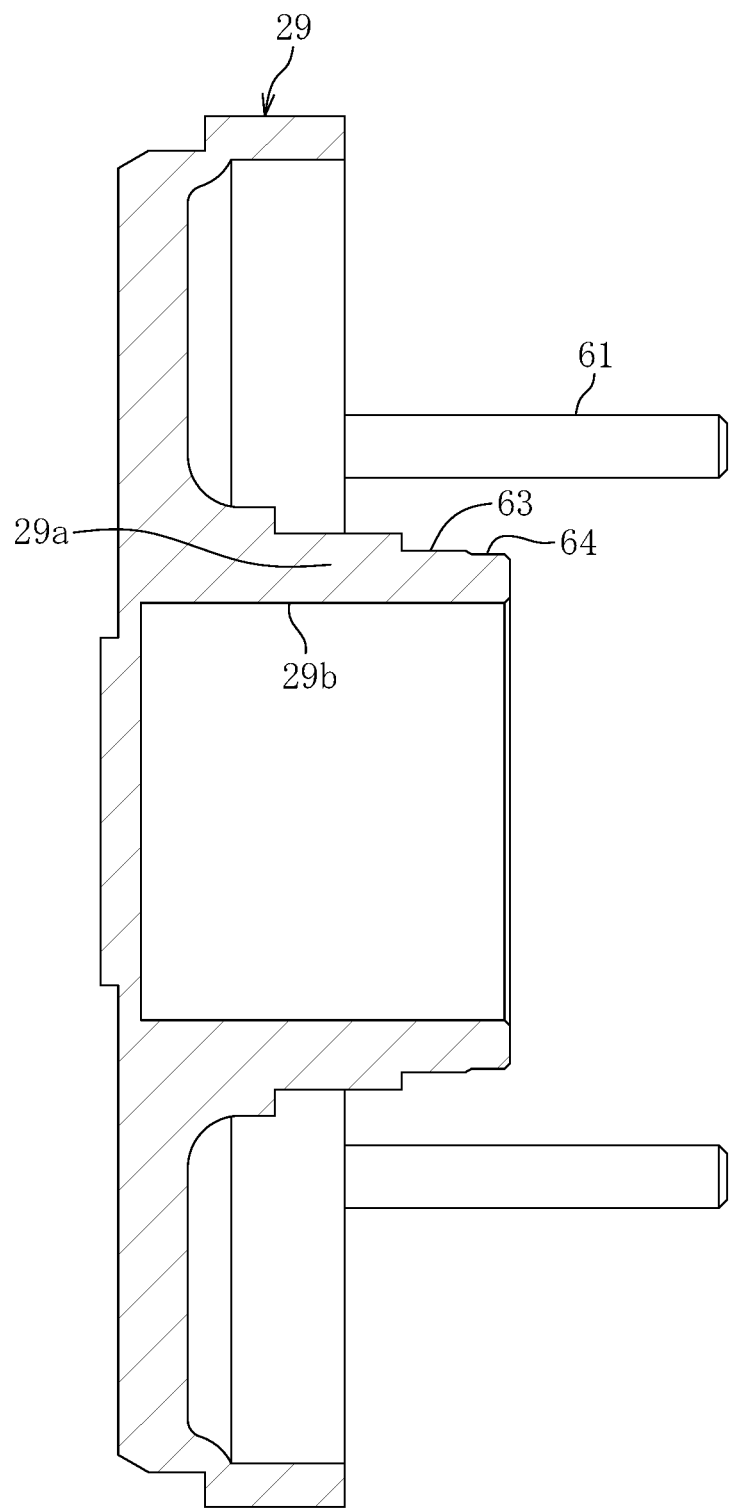
FIG. 10 is a sectional view as seen from a direction indicated by the arrows of the line I-I in FIG. 9.

Details of the cover 29 are described with reference to FIG. 9 and FIG. 10. FIG. 9 is a left side view of FIG. 1. FIG. 10 is a sectional view as seen from a direction indicated by the arrows of the line I-I in FIG. 9. The cover 29 is made of a metal material which is excellent in ease of processing (capability of mass production) and thermal conductivity, such as an aluminum alloy, a zinc alloy, or a magnesium alloy. Although illustration is omitted, cooling fins for enhancing cooling efficiency of the electric actuator 1 may be provided on an outer surface of the cover 29. As illustrated in FIG. 10, on an outer peripheral surface of the cylindrical portion 29*a* of the cover 29, there are formed a bearing mounting surface 63 to which the rolling bearing 30 is mounted and a fitting surface 64 to which the thrust receiving ring 46 is fitted. Moreover, as illustrated in FIG. 9, the cover 29 has through holes (not shown) into which the assembly bolts 61 of the electric actuator 1 are inserted and through holes 62 into which mounting bolts for mounting the electric actuator 1 to a device to be used are inserted.

Figure 6:
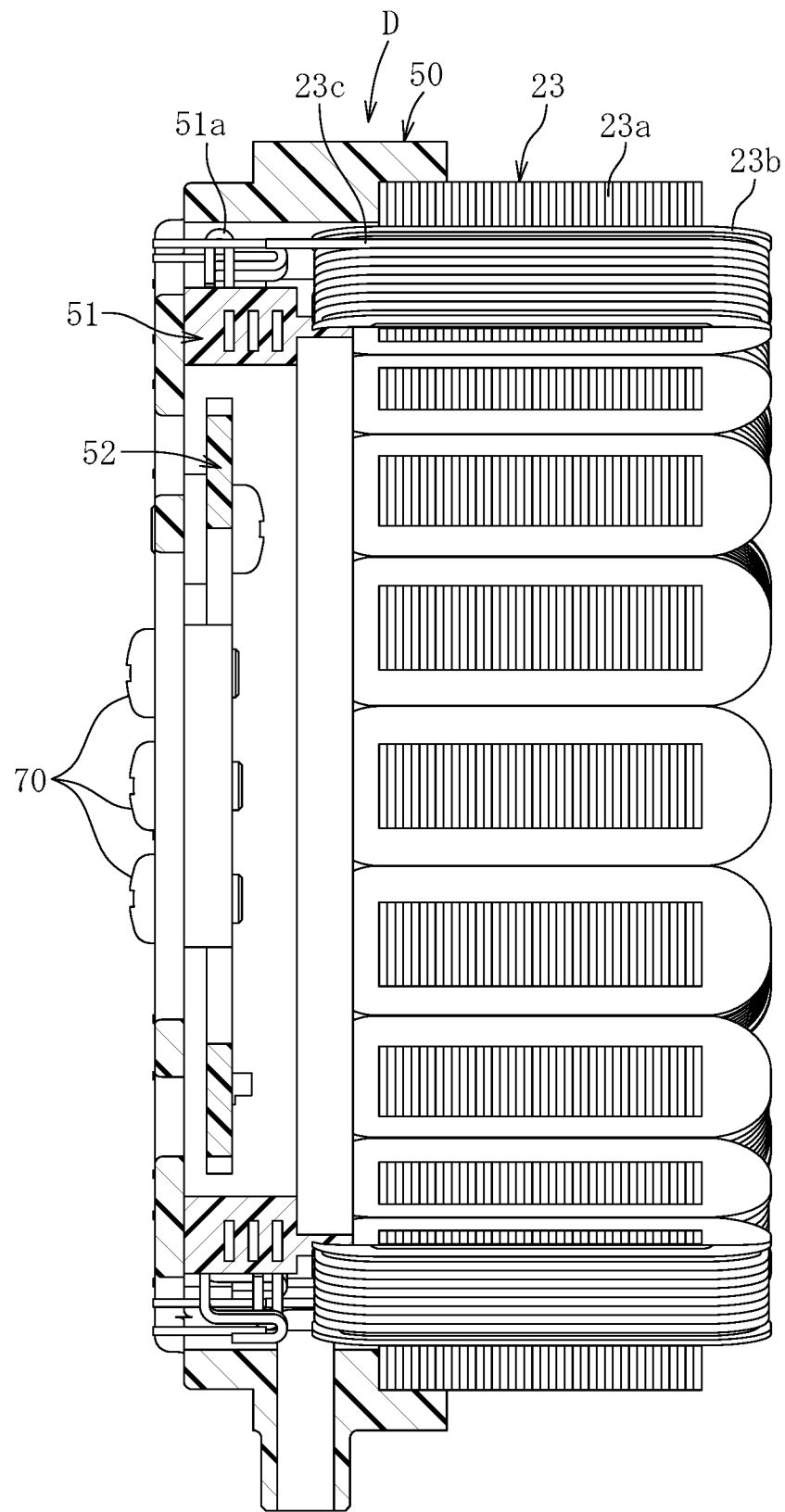
FIG. 6 is an enlarged vertical sectional view for illustrating a stator of the motor and a terminal part.
Figure 7:
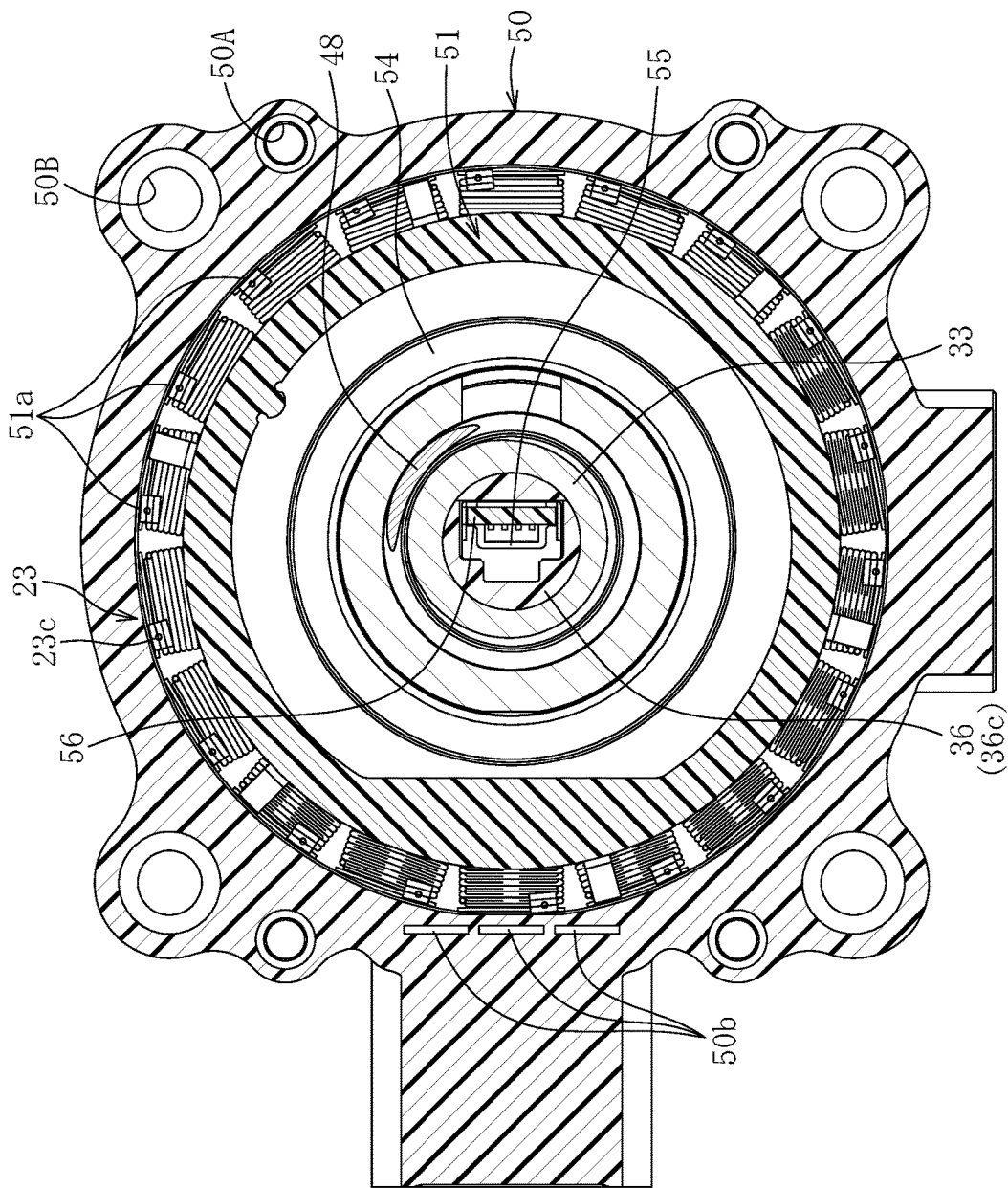
FIG. 7 is a sectional view as seen from a direction indicated by the arrows of the line G-G in FIG. 1.
Figure 8:
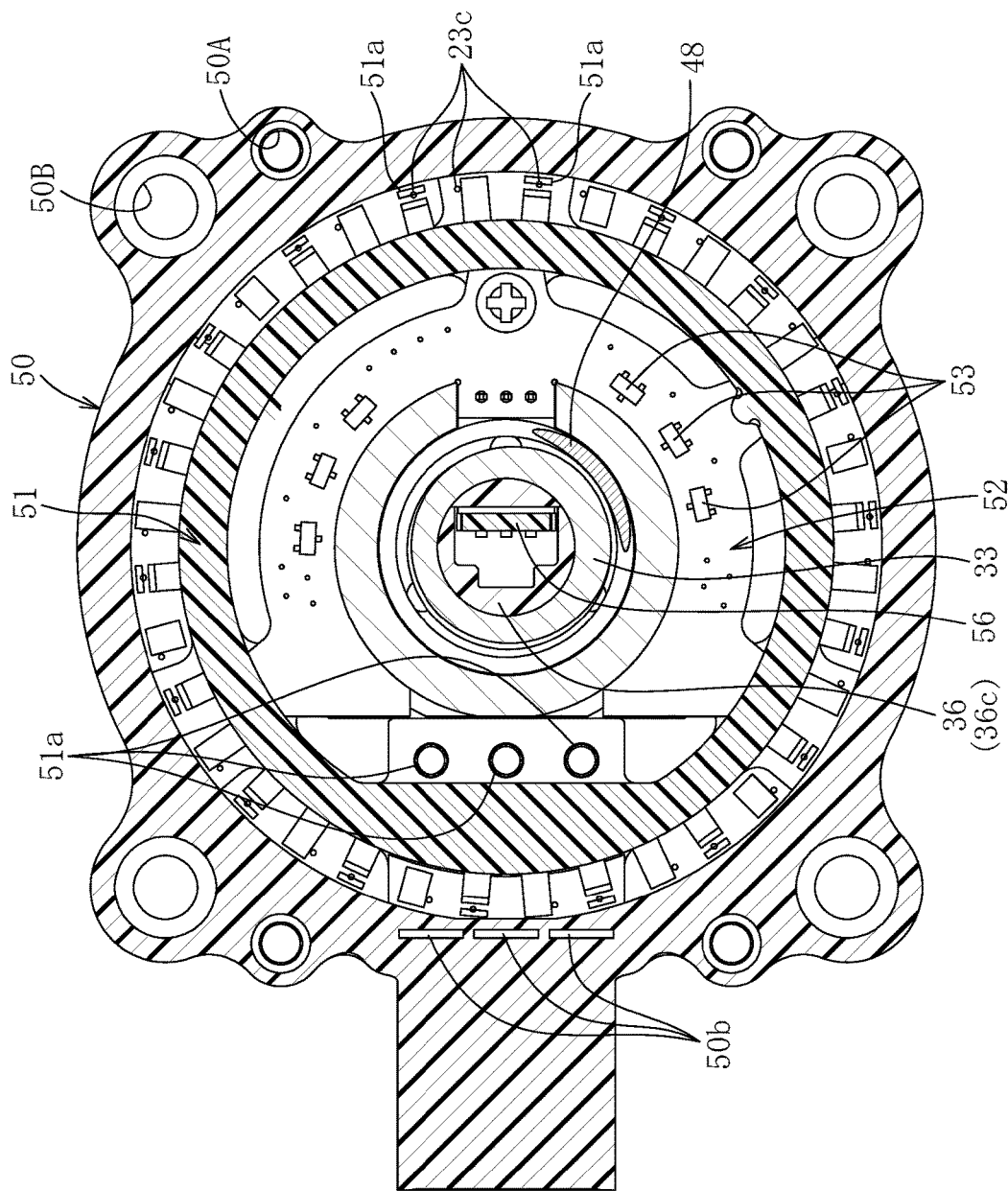
FIG. 8 is a sectional view as seen from a direction indicated by the arrows of the line H-H in FIG. 1.

Next, with reference to FIG. 1 and FIG. 6 to FIG. 8, description is made of the terminal part D. FIG. 6 is an enlarged vertical sectional view for illustrating the stator 23 of the motor 25 and the terminal part D illustrated in FIG. 1. FIG. 7 is a sectional view as seen from a direction indicated by the arrows of the line G-G in FIG. 1. FIG. 8 is a sectional view as seen from a direction indicated by the arrows of the line H-H in FIG. 1. As illustrated in FIG. 6, the terminal part D comprises a terminal main body 50, a bus bar 51, and a print board 52. The terminal main body 50 integrally comprises a short tubular portion and a disc-shaped portion. The short tubular portion forms a part of the housing 2. The disc-shaped portion extends radially inward from an end portion of the short tubular portion on the another side in the axial direction. The bus bar 51 and the print board 52 are fixed by screws to (the disc-shaped portion of) the terminal main body 50. As illustrated in FIG. 7 and FIG. 8, (the short tubular portion of) the terminal main body 50 has through holes 50A into which the assembly bolts 61 illustrated in FIG. 9 and FIG. 10 are inserted and through holes 50B into which bolts for mounting the electric actuator 1 to a device to be used are inserted. The terminal main body 50 is sandwiched between the casing 20 and the cover 29 by the assembly bolts 61 (see FIG. 1). The terminal main body 50 is made of a resin material such as PPS.

The terminal part D (terminal main body 50) holds a power supply circuit for supplying drive power to the motor 25. The power supply circuit is formed by connecting coils 23*c* of the stator 23 to terminals 51*a* of the bus bar 51 for respective phases of a U-phase, a V-phase, and a W-phase as illustrated in FIG. 7 and FIG. 8, and fastening a terminal 51*b* of the bus bar 51 and a terminal base 50*a* of the terminal main body 50 with each other by a screw 70 as illustrated in FIG. 2. The terminal base 50*a* comprises a terminal 50*b* to which a lead line (not shown) is connected, and the lead line is drawn out to a radially outer side of the housing 2 through an opening portion 50*c* (see FIG. 1) formed in an outer peripheral portion (short tubular portion) of the terminal main body 50, and is connected to a controller 81 of a control device 80 (see FIG. 12).

Two types of sensors are mounted to the electric actuator 1 of this embodiment. Those two types of sensors are held on the terminal part D. As illustrated in, for example, FIG. 1, one of the two types of sensors is a rotation angle detection sensor 53 for use in rotation control of the motor 25, and another is a stroke detection sensor 55 for use in stroke control (detection of the amount of displacement in the axial direction) of the ball screw shaft 33. For each of the rotation angle detection sensor 53 and the stroke detection sensor 55, there is used a Hall sensor being one type of magnetic sensors.

As illustrated in FIG. 1 and FIG. 8, the rotation angle detection sensor 53 is mounted to the print board 52 having a disc shape, and is arranged so as to be opposed to a pulser ring 54, which is mounted to an end portion of the rotor inner 26 on the another side in the axial direction, through an axial gap. The rotation angle detection sensor 53 is configured to determine timings of causing an electric current to flow through the U-phase, the V-phase, and the W-phase of the motor 25.

Figure 11:
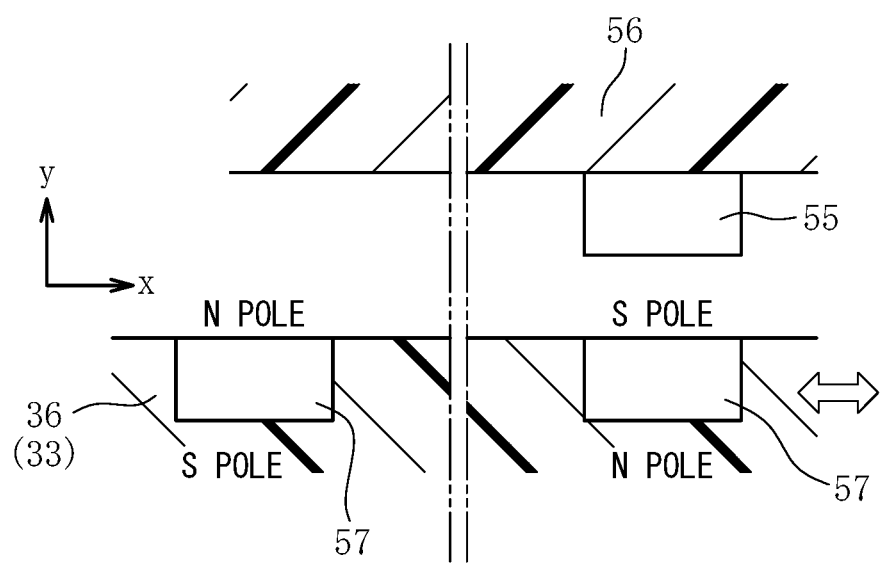
FIG. 11 is a schematic view for illustrating a mode of detection of the amount of displacement of the ball screw shaft by a stroke detection sensor.

As illustrated in FIG. 2, FIG. 7, and FIG. 8, the stroke detection sensor 55 is mounted to a band-shaped print board 56. The print board 56 extends in the axial direction, and an end portion thereof on the another side in the axial direction is connected to the print board 52. The print board 56 and the stroke detection sensor 55 are arranged inside the hole portion 33*b* of the ball screw shaft 33, specifically, on an inner periphery of the cylinder portion 36*c* of the spring mounting collar 36 received in the hole portion 33*b*. Moreover, on the inner periphery of the cylinder portion 36*c* of the spring mounting collar 36, permanent magnets 57 being targets are mounted so as to be opposed to the stroke detection sensor 55 through a radial gap. In this embodiment, the permanent magnets 57 are provided at two positions apart from each other in the axial direction. As schematically illustrated in FIG. 11, the stroke detection sensor 55 formed of the Hall sensor detects a magnetic field "x" in the axial direction and a magnetic field "y" in the radial direction which are formed around the permanent magnets 57, and calculates the amount of displacement of the ball screw shaft 33 in the axial direction based on the detection of the magnetic fields.

Figure 12:
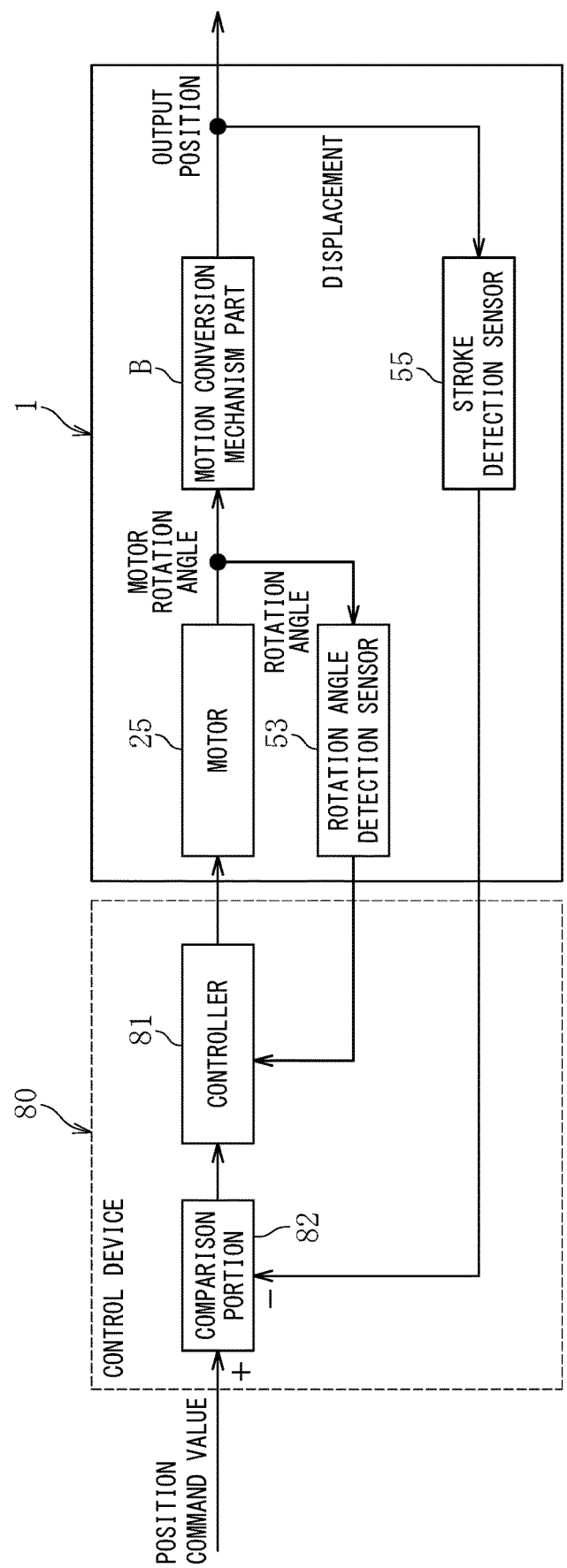
FIG. 12 is a block diagram for illustrating a control system for the electric actuator.

Although detailed illustration is omitted, a signal line of the rotation angle detection sensor 53 and a signal line of the stroke detection sensor 55 are each drawn out to the radially outer side of the housing 2 through the opening portion 50c (see FIG. 1) of the terminal main body 50 and connected to the control device 80 (see FIG. 12).

Figure 5:
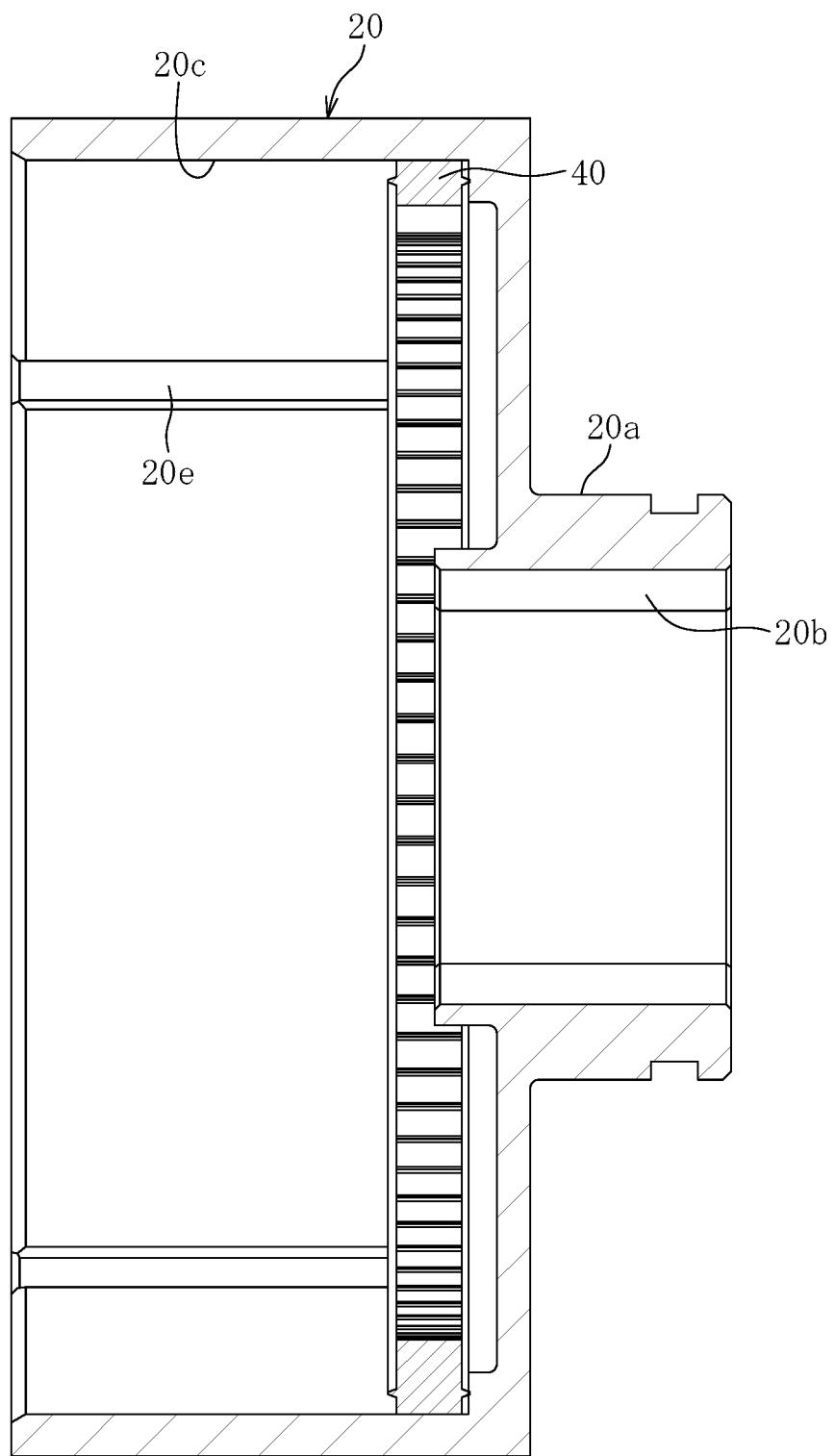
FIG. 5 is a vertical sectional view for illustrating a state in which a ring gear is assembled to a casing.

A procedure of assembling the electric actuator 1 having the above-mentioned configuration is briefly described. First, as illustrated in FIG. 5, the ring gear 40 is assembled to the casing 20. Next, a subassembly comprising the rotor 24 of the motor 25 and the motion conversion mechanism part B illustrated in FIG. 3 is inserted into the casing 20. At this time, the planetary gears 42 are brought into mesh with the ring gear 40, and the guide collars 38 are fitted to the guide grooves 20b of the casing 20. Further, the bearing holder 28 is fitted to the inner peripheral surface 20c of the casing 20. After that, of the subassembly comprising the stator 23 of the motor 25 and the terminal main body 50 (terminal part D) illustrated in FIG. 6, the stator 23 is fitted to the inner periphery of the casing 20, and then the cover 29 and the terminal main body 50 are fastened to the casing 20 by the assembly bolts 61 (see FIG. 9). In such a manner, the electric actuator 1 is brought into completion.

As described above, in the ball screw device 31 and the electric actuator 1 employing the ball screw device 31 in the motion conversion mechanism part B according to the present invention, the ball screw shaft 33 has a hollow shape, and the stroke detection sensor 55 configured to detect the amount of displacement of the ball screw shaft 33 in the axial direction is arranged on the inner periphery of the ball screw shaft 33. With such a configuration, the amount of displacement of the ball screw shaft 33 in the axial direction can be directly detected. Thus, the detection of the amount of displacement of the ball screw shaft 33 is not affected by, for example, play, rigidity, and operation accuracy of the ball screw device 31 comprising the ball screw shaft 33 and the ball screw nut 32. Therefore, the amount of displacement of the ball screw shaft 33 in the axial direction can be accurately detected. Moreover, in this embodiment, the planetary gear speed reducer 10 configured to reduce the speed of rotation of the motor part A and transmit the rotation to the ball screw nut 32 is provided to the motion conversion mechanism part B. However, the play or operation accuracy of the planetary gear speed reducer 10 does not affect the detection of the amount of displacement of the ball screw shaft 33 in the axial direction. Therefore, the ball screw device 31 as well as the electric actuator 1 which are highly reliable with excellent operation accuracy of the ball screw shaft 33 can be achieved. Further, the stroke detection sensor 55 is arranged on the inner periphery of the ball screw shaft 33 having a hollow shape. Therefore, unlike the case in which the sensor of this type is arranged outside the ball screw shaft 33, it is not required that a dedicated space for arrangement of the sensor be additionally secured. Therefore, the electric actuator 1 can be reduced in weight and size, thereby being capable of enhancing mountability with respect to a device to be used.

Moreover, the end portion of the rotor inner 26 on the one side in the axial direction is rotatably supported by the rolling bearing 27 arranged close to the end portion of the rotor core 24a on the one side in the axial direction, and the end portion of the rotor inner 26 on the another side in the axial direction is rotatably supported by the rolling bearing 30 arranged close to the end portion of the rotor core 24a on the another side in the axial direction. With such a structure, the rotor inner 26 can be reduced in size in the axial direction. In addition, in combination with the structure in which the rolling bearing 27 is arranged within an axial width of the ball screw nut 32, an axial dimension L (see FIG. 1) of the housing 2 of the electric actuator 1 can be shortened.

Further, as long as the rotation of the rotor 24 is balanced, it is only required that the rolling bearings 27 and 30 configured to support the rotor inner 26 be capable of supporting a radial load as small as the own weight of the rotor 24. In this case, it is not required that the rotor inner 26 integrally having the inner raceway surface 27a of the rolling bearing 27 be made of a material having a high strength. A required strength can be secured even when the rotor inner 26 is made of, for example, an inexpensive soft steel material for which thermal treatment such as quenching and tempering is omitted. In particular, in this embodiment, the rotary motion of the motor 25 is transmitted to the ball screw nut 32 through the planetary gear speed reducer 10. Thus, the radial load is not generated. Moreover, the reaction force (thrust load) generated along with the linear motion (in particular, advance movement) of the ball screw shaft 33 is directly supported by the thrust needle roller bearing 47. Thus, it is only required that the rolling bearing 27 have a function of positioning in the radial direction, and hence the above-mentioned material specification is sufficient for the rotor inner 26 integrally having the inner raceway surface 27a of the rolling bearing 27. With this configuration, the electric actuator 1 can be reduced in cost.

Moreover, the thrust needle roller bearing 47 is arranged within a range in the axial direction between the rolling bearings 27 and 30 configured to support the rotor inner 26. Thus, it is advantageous with respect to the moment load, and a bearing having a small size can be used. In particular, when the thrust needle roller bearing 47 is arranged near a center portion in the axial direction between the rolling bearings 27 and 30 configured to support the rotor inner 26 as in this embodiment, it is extremely advantageous with respect to the moment load, thereby being capable of further promoting downsizing of the thrust needle roller bearing 47. As a result, for example, the thrust needle roller bearing 47 and the thrust receiving ring 46 having an extremely small size can be employed. Accordingly, the electric actuator 1 as a whole can be reduced in size.

Moreover, the cylindrical portion 43a of the planetary gear carrier 43 serves as an output portion of the planetary gear speed reducer 10, and the cylindrical portion 43a is press-fitted to the outer peripheral surface 32b of the ball screw nut 32 to couple the planetary gear carrier 43 and the ball screw nut 32 to each other so that torque can be transmitted. Thus, ease of coupling operation at the time of assembly is excellent, and stable torque transmission can be performed with respect to high torque after reduction in speed.

Moreover, with a combination of downsizing of the motor part A (motor 25) by providing the planetary gear speed reducer 10 to the motion conversion mechanism part B and the structure in which the rotor inner 26, the cylindrical portion 43a of the planetary gear carrier 43, and the ball screw nut 32 overlap in the radial direction, a radial dimension M (see FIG. 1) of the housing 2 of the electric actuator 1 can also be reduced. With this configuration, the electric actuator 1 can be further reduced in size, and mountability with respect to a device to be used is further improved.

Moreover, the rotor inner 26 and the sun gear 41 are coupled to each other through press-fitting of the sun gear 41 of the planetary gear speed reducer 10 to the inner peripheral surface of the rotor inner 26 so that torque can be transmitted. Also in this point, the ease of coupling operation at the time of assembly is excellent. Even when such a coupling structure is employed, the sun gear 41 is only required to rotate together with the rotor inner 26 before reduction in speed, and hence the torque transmission performance required between the sun gear 41 and the rotor inner 26 can be sufficiently secured. Further, the rotor inner 26 and the sun gear 41 are coupled to each other at a position directly below the rolling bearing 27 configured to support the rotor inner 26. Thus, the rotation accuracy of the sun gear 41 is also excellent.

Further, the rotor inner 26 and the ball screw nut 32 are formed as separate members. Thus, for example, even when the ball screw device 31 having a different specification is employed, the rotor inner 26 (as well as the motor part A) can be standardized. With this, versatility can be improved, and series production of various types of the electric actuator 1 with standardized components can easily be achieved.

Further, there is employed a sandwich structure of holding, for example, the power supply circuit, the rotation angle detection sensor 53, and the stroke detection sensor 55 with the terminal main body 50 and sandwiching the terminal main body 50 (terminal part D) between the casing 20 and the cover 29 in the axial direction. Therefore, the ease of assembly is excellent. Further, with the sandwich structure described above and the structure in which the lead line of the power supply circuit and the signal line of the sensor can be drawn out to the radially outer side of the housing 2 (electric actuator 1) through the opening portion 50c formed in the outer peripheral portion (short tubular portion) of the terminal main body 50, there can be achieved an electric actuator comprising a plurality of electric actuators 1 arrayed in the axial direction and being capable of operating a plurality of objects to be operated individually.

Finally, with reference to FIG. 1 and FIG. 12, an operation mode of the electric actuator 1 of this embodiment is briefly described. Although illustration is omitted, for example, when an operation amount is input to an ECU provided at an upper position of the vehicle, the ECU calculates a requested position command value based on the operation amount. As illustrated in FIG. 12, the position command value is transmitted to the controller 81 of the control device 80, and the controller 81 calculates a control signal of a motor rotation angle required in accordance with the position command value, and transmits the control signal to the motor 25.

The rotor 24 (rotor inner 26) rotates based on the control signal transmitted from the controller 81, and the rotary motion is transmitted to the motion conversion mechanism part B. Specifically, when the rotor inner 26 rotates, the sun gear 41 of the planetary gear speed reducer 10 coupled to the rotor inner 26 rotates. Along with this rotation, the planetary gears 42 revolve, and the planetary gear carrier 43 rotates. With this, the rotary motion of the rotor inner 26 is transmitted to the ball screw nut 32 coupled to the planetary gear carrier 43. At this time, the revolving motion of the planetary gears 42 reduces the rotation number of the rotor inner 26, thereby increasing rotation torque transmitted to the ball screw nut 32.

When the ball screw nut 32 rotates upon receiving the rotary motion of the rotor inner 26, the ball screw shaft 33 performs the linear motion (advances) toward the one side in the axial direction while being stopped in rotation. At this time, the ball screw shaft 33 advances to a position based on the control signal of the controller 81, and the actuator head 39 mounted to the end portion of the ball screw shaft 33 on the one side in the axial direction operates an object to be operated (not shown) in the axial direction.

An axial position (amount of displacement in the axial direction) of the ball screw shaft 33 is detected by the stroke detection sensor 55 as illustrated in FIG. 12, and a detection value thereof is transmitted to a comparison portion 82 of the control device 80. Then, the comparison portion 82 calculates a difference between a detection value detected by the stroke detection sensor 55 and a position command value, and the controller 81 transmits a control signal to the motor 25 based on the detection value and the signal transmitted from the rotation angle detection sensor 53. In such a manner, a position of the actuator head 39 is subjected to feed back control. Therefore, when the electric actuator 1 of this embodiment is applied to, for example, a shift-by-wire system, a shift position can be reliably controlled. The power for driving the motor part A (motor 25) and the sensors 53 and 55 is supplied from an external power supply (not shown) such as a battery provided on the vehicle side to the motor 25 through the control device 80.

In the above, description is made of the ball screw device 31 and the electric actuator 1 including the same according to one embodiment of the present invention. However, the present invention is not limited to the embodiment described above.

For example, in the embodiment described above, the hole portion 33b (through hole in the axial direction) opened in both end surfaces of the ball screw shaft 33 in the axial direction is formed so that the ball screw shaft 33 has a hollow shape, and the stroke detection sensor 55 is arranged on the inner periphery of the ball screw shaft 33. However, the ball screw shaft 33 may have a hole portion 33b which is opened only in the end surface on another side in the axial direction and extends in the axial direction, and the stroke detection sensor 55 may be arranged in the hole portion 33b.

Moreover, in the embodiment described above, the compression coil spring 48 serving as an urging member configured to always urge the ball screw shaft 33 to the original point side is provided. However, it is only required that the compression coil spring 48 be provided depending on the use which requires the urging function, and the compression coil spring 48 may be omitted when it is not required.

Moreover, in the embodiment described above, the planetary gear speed reducer 10 is employed as a speed reducer forming the motion conversion mechanism part B. However, a speed reducer having another mechanism may be employed. Moreover, the present invention is applicable not only to the electric actuator 1 comprising the speed reducer but also to the electric actuator 1 not comprising the speed reducer. Although illustration is omitted, when the speed reducer is omitted, it is only required that the ball screw nut 32 and the rotor inner 26 be directly coupled to each other so that torque can be transmitted.

Moreover, the ball screw device 31 according to the present invention is applicable not only to the electric actuator 1 described above but also to other electric devices.

The present invention is not limited to the above-mentioned embodiment. As a matter of course, the present invention may be carried out in various modes without departing from the spirit of the present invention. The scope of the present invention is defined in claims, and encompasses equivalents described in claims and all changes within the scope of claims.

REFERENCE SIGNS LIST 1 electric actuator
2 housing
10 planetary gear speed reducer (speed reducer)
20 casing
23 stator
24 rotor
25 motor
26 rotor inner
29 cover
31 ball screw device
32 ball screw nut
33 ball screw shaft
33b hole portion
34 ball
40 ring gear
41 sun gear
42 planetary gear
43 planetary gear carrier
47 thrust needle roller bearing
48 compression coil spring (urging member)
50 terminal main body
50c opening portion
55 stroke detection sensor
57 permanent magnet
A motor part
B motion conversion mechanism part
C operation part
D terminal part
L axial dimension of housing
M radial dimension of housing

The invention claimed is:

1. An electric actuator comprising:
a motor part configured to be driven upon receiving a supply of power;
a motion conversion mechanism part configured to convert rotary motion of the motor part into linear motion;
a housing accommodating the motor part and the motion conversion mechanism part; and
a terminal part,
wherein the motion conversion mechanism part comprises a ball screw device, the ball screw device comprising:
a ball screw shaft; and
a ball screw nut that is rotatably fitted to an outer periphery of the ball screw shaft through intermediation of a plurality of balls,
wherein the ball screw shaft advances and retreats in an axial direction along with rotation of the ball screw nut,
wherein the ball screw shaft has a hollow shape having a hole portion extending in the axial direction,
wherein a stroke detection sensor configured to detect an amount of displacement of the ball screw shaft in the axial direction is arranged in the hole portion,
wherein the housing comprises a plurality of members coupled in the axial direction,
wherein the terminal part is configured to hold a power supply circuit and the stroke detection sensor, the power supply circuit being configured to supply the power to the motor part,
wherein the terminal part integrally comprises a tubular portion that forms a part of the housing, and
wherein the tubular portion is sandwiched by other members of the plurality of members forming the housing from both sides in the axial direction.

2. The electric actuator according to claim 1, wherein the stroke detection sensor is a Hall sensor configured to detect a magnetic field in the axial direction and a radial direction formed in a periphery of a permanent magnet arranged so as to be opposed to the stroke detection sensor through a radial gap, and calculate the amount of displacement of the ball screw shaft in the axial direction based on the detection of the magnetic field.

3. The electric actuator according to claim 1, wherein a center axis of the ball screw shaft and a rotation center of the motor part match with each other.

4. The electric actuator according to claim 1, wherein the motion conversion mechanism part further comprises a speed reducer configured to reduce a speed of rotation of the motor part and transmit the rotation to the ball screw nut.

5. The electric actuator according to claim 4, wherein the speed reducer comprises a planetary gear speed reducer.

6. The electric actuator according to claim 1, further comprising an urging member configured to always urge the ball screw shaft to an original point side.

7. The electric actuator according to claim 1, wherein the terminal part has, on an outer peripheral portion thereof, an opening portion for allowing a lead wire connected to the power supply circuit and a signal line connected to the stroke detection sensor to be drawn out to a radially outer side of the housing.

* * * * *